United States Patent
Minner

(10) Patent No.: US 6,295,049 B1
(45) Date of Patent: Sep. 25, 2001

(54) COMPUTER SYSTEM UTILIZING GRAPHICAL USER INTERFACE WITH HYSTERESIS TO INHIBIT ACCIDENTAL SELECTION OF A REGION DUE TO UNINTENDED CURSOR MOTION AND METHOD

(76) Inventor: Richard T. Minner, 2635 Napoli Ct., Carmichael, CA (US) 95608

(*) Notice: Subject to any disclaimer, the term of this patent is extended or adjusted under 35 U.S.C. 154(b) by 0 days.

(21) Appl. No.: 09/261,818

(22) Filed: Mar. 3, 1999

(51) Int. Cl.[7] .................................................. G09G 5/08
(52) U.S. Cl. ......................... 345/145; 345/146; 345/157
(58) Field of Search .................................. 345/157, 159, 345/163, 164, 326, 332, 334, 340, 145, 146, 156, 173

(56) References Cited

U.S. PATENT DOCUMENTS

| 5,298,890 | * | 3/1994 | Kanamaru et al. | 345/157 |
| 5,508,717 | * | 4/1996 | Miller | 345/145 |
| 5,592,195 | * | 1/1997 | Misono et al. | 345/146 |
| 5,757,358 | * | 5/1998 | Osga | 345/146 |
| 5,786,805 | * | 7/1998 | Barry | 345/159 |
| 5,880,717 | * | 3/1999 | Chan et al. | 345/173 |
| 5,929,840 | * | 7/1999 | Brewer et al. | 345/145 |

* cited by examiner

Primary Examiner—Steven Saras
Assistant Examiner—Fritz Alphonse
(74) Attorney, Agent, or Firm—Paul R. Martin

(57) ABSTRACT

A computer system, medium and method is disclosed for controlling selection and deselection of selectable regions on a computer display screen by a cursor, in such a manner as to compensate for the effects of jitter in the cursor control device. The system, medium, and method utilize a hysteresis technique, to accomplish their objectives. In a system with hysteresis it takes more force to effect a state change than would normally be the case; a state is harder to enter than it would otherwise be, and a state, once entered, is harder to leave than it would otherwise be. Such a state system with hysteresis is implemented in the present invention by having two thresholds for a state transition; one applied when moving into the state and the other applied when moving out of the state

12 Claims, 10 Drawing Sheets

DUAL THRESHOLD

SINGLE THRESHOLD

COMPUTER SYSTEM UTILIZING GRAPHICAL USER INTERFACE WITH HYSTERESIS TO INHIBIT ACCIDENTAL SELECTION OF A REGION DUE TO UNINTENDED CURSOR MOTION AND METHOD

BACKGROUND OF THE INVENTION

1. Field of the Invention

The present invention relates to a computer system utilizing a graphical user interface with hysteresis. More particularly, it relates to a computer graphical user interface that minimizes the deleterious effects of small, unintentional movements of the interface device that controls the display cursor appearing on the computer monitor display screen. The invention further relates to a computer readable medium upon which a computer program is stored, and a computer implemented method of inhibiting the accidental selection of a region of a computer display screen.

Computer systems with graphical user interfaces commonly include a display on the computer's monitor of a computer-rendered display cursor pointing to a particular one of the display's pixels (picture elements). The pixel-based display is typically under the control of a computer input device, such as a computer mouse, trackball, touch-sensitive pad or joystick, designed specifically for cursor control.

It is common for the display screens of computer graphic applications to include a number of well defined selectable regions, often (but not necessarily) rectangular, each of which "responds" differently to user input, in the specific sense that when the display cursor enters one of these regions, the computer's state changes, and, simultaneously, the display changes to indicate the change of state.

The following is a more detailed explanation of computer states and of how they respond to cursor location. Every computer commonly sold has a finite (but potentially very large) list of possible states. A computer state is a distinct program (or procedure or algorithm) for processing computer inputs; the computer state changes whenever the computer changes its algorithm for processing computer inputs. For example, when the "caps lock" key on a standard keyboard has been pressed, the computer will process subsequent keystrokes differently than it otherwise would. A computer with its caps lock key depressed thus behaves like a different machine from a computer without its caps lock key depressed. Standard computer science terminology calls two such states two different "virtual machines," since the single computer behaves like two different machines. The "caps lock" example is a non-typical but very easy to grasp example of a state change.

It is more typical in computer terminology to talk about state changes which are controlled by computer software. On computers with graphical user interfaces and mouse-controlled cursors, state changes are often effected by mouse moves. For example, whenever there is a change in the action the computer is programmed to take, in response to a subsequent mouse click, the computer has, by definition of a "computer state", entered a new state. It is common in turn to have the computer's programmed response to a mouse click (and perhaps also to other computer inputs) depend on the cursor position. On a typical computer graphics screen there are a number of rectangular regions depicted, each having the property such that when the cursor enters one of these regions the computer is caused to enter a state associated with the region. These regions are called selectable regions. On every screen there is at least one such region, but normally there are two or more.

Typically, such a state change is indicated by a change in the shape or color of the cursor or by a change in the color of the selectable region. For example, publicly accessible pages on the Internet typically seen on a computer monitor when the Internet is accessed, are written in HTML (HyperText Markup Language). Any one HTML page can include references or links to another HTML page. The link may be represented in the HTML page by a section of text or by a graphical icon. In the computer browsers which display HTML pages on the Internet, the region on an HTML page representing a link to another page is a selectable region. When the cursor enters any such selectable region the browser, which is implemented in computer software, enters a state in which the next mouse click (or equivalent action) will cause the indicated linked page to be loaded onto the display screen as the current page. Thus, in this example, the state of the computer is under the control of computer software (the browser).

In many Internet browsers the cursor on the computer display screen changes shape when it is moved to or enters a selectable region or when it is moved or transits from any one region to any other region. In one popular browser the cursor changes from its default arrow shape to a rendition of a pointing hand when the selectable region is entered, and then changes back to an arrow when a non-selectable region is reentered. The above Internet example is just one of many examples of computer graphic software applications in which the computer display includes a number of cursor-selectable regions, and in which selecting a new region causes the computer to enter a new state.

If a cursor-selectable region on the display screen is small or narrow, which is often the case, it may require precise manipulation of the cursor by the computer operator to select it. In moving the cursor across the screen to move from a non-selectable region to a selectable region, small, unintended motions or jitters of the computer operator's hand on the cursor control device may cause the cursor to move in and out of the selected region so that the region becomes unintentionally deselected. This is a very common occurrence, and may happen when using a computer mouse, for example, as a result of clicking the mouse button, or as a consequence of other accidental motion of the hand that holds the mouse. Such accidental deselection of a region, or accidental selection of an undesired adjacent region, is a hindrance to proper operation of a graphical user interface. It will hinder operation of the computer system severely in cases in which the state transition associated with the change of region is time consuming, i.e., when it takes a long time for the computer program to effect the desired change.

2. Description of the Related Art

It is known in the art to design digital logic for management of a cursor control device in such a manner that jitter in the cursor control device is smoothed out by the control device's digital logic management electronic circuit. The result is that the signal transmitted from the control device to the computer is modified in such a way that it appears to the computer that the device is moving smoothly, without jitter. Such an invention is described in U.S. Pat. No. 5,027,109, issued to Paul M. Donovan and Swee T. Chia, entitled, "Apparatus and Method for Minimizing Undesired Cursor Movement in a Computer Controlled Display System."

It can be said of such an invention as the '109 patent that it corrects the control device's jitter before the device's signal reaches the computer. In fact, the input device really does jitter, but the signal it sends to the computer is corrected so as to make it appear that it is moving smoothly. While such an invention is useful, it has the drawback that it requires the computer system incorporate special digital electronic logic for control of the cursor control device. Thus, it is a solution whose availability depends on the decisions of the manufacturers of computer systems whether or not to incorporate such special digital logic into their cursor control devices. If, as is likely, the computer system lacks such special digital logic for jitter minimization, then all the deleterious consequences of jitter in the cursor control device will remain.

Accordingly, it is clear that what is needed in the art is a means for ameliorating the deleterious effects of jitter in the cursor control device without the necessity of adding to the computer system special digital logic for correcting the signal the cursor control device transmits to the computer. Disclosed below is a new and novel computer system, computer readable medium, and method for compensating for jitter in the graphical control device without the necessity of adding special digital control logic to the control device.

SUMMARY OF THE INVENTION

A computer system, medium and method is disclosed of controlling selection and deselection of selectable regions on a computer display screen by a cursor, in such a manner as to compensate for the effects of jitter in the cursor control device. The system, medium, and method utilize a hysteresis technique, to accomplish their objectives. In a system with hysteresis it takes more force to effect a state change than would normally be the case; a state is harder to enter than it would otherwise be, and a state, once entered, is harder to leave than it would otherwise be. Such a state system with hysteresis is implemented in the present invention by having two thresholds for a state transition; one applied when moving into the state and the other applied when moving out of the state. This is contrasted with the non-hysteresis system in which there is a knife-edge single threshold used for detecting both entry into the state and exit from it. In the present invention the dual threshold system is implemented by replacing the single boundary of a selectable region with a pair of boundaries. An inner boundary is used to ascertain whether the region has been entered. An outer boundary is used to ascertain whether the region has been exited. Between the two boundaries is a "neutral region". When the cursor enters the neutral region the system's state remains unchanged; the system acts as if the prior region had not been exited. Thus in the computer graphical user interface system with hysteresis, it takes more "power" (it is necessary to move further inside the region) to effect a transition into a selectable region than in the system with no hysteresis, and, conversely, once a selectable region has been entered it takes more "power" (it is necessary to move further outside the region) to effect a transition back out of the selectable region than in the system with no hysteresis. Thus the system, medium, and method of this invention all incorporate the hysteresis effect to smooth out the jitter in control devices. The exact means by which hysteresis is added to the system, medium, and method of this invention, and the effects thereof, will be made clear in the subsequent descriptions of the specific embodiments.

DEFINITIONS

A number of specific terms are used herein. These are defined as follows:

The term "graphical user interface" means an icon and pictorial method of allowing a user to access a computer by using the operating system. The user manipulates a mouse or other input device, and this in turn moves the cursor on the monitor. Once a desired location is achieved, the mouse is clicked, to select an icon or activate a program.

The term "computer state" refers to a distinct program for processing computer inputs.

The term "hysteresis" refers to a condition in which it takes more force to effect a state change than would otherwise be the case.

The term "pixel" stands for picture element, the smallest point or dot of information in a raster image.

The term "selectable region" refers to a region on the computer display screen, which when entered by a cursor, causes the computer to change its state.

The term "border region" refers to a region on the computer display screen, adjacent to the periphery of a non-selectable or selectable region.

BRIEF DESCRIPTION OF THE DRAWINGS

FIG. 6 shows the individual pixels of a portion of a computer display screen which has been separated into five regions.

FIG. 7 shows the five regions of FIG. 6, and further shows border regions used to implement the hysteresis schema identified for each.

FIG. 8 shows the regions of FIG. 7, after the identification, for each pixel of each border region, of the "friendly" regions associated with it, under one hysteresis schema.

FIG. 10 shows the screen of FIG. 9 after the three windows have been moved by the user, revealing a fourth previously-obscured window.

DESCRIPTION OF THE SPECIFIC EMBODIMENTS

Figure 1:
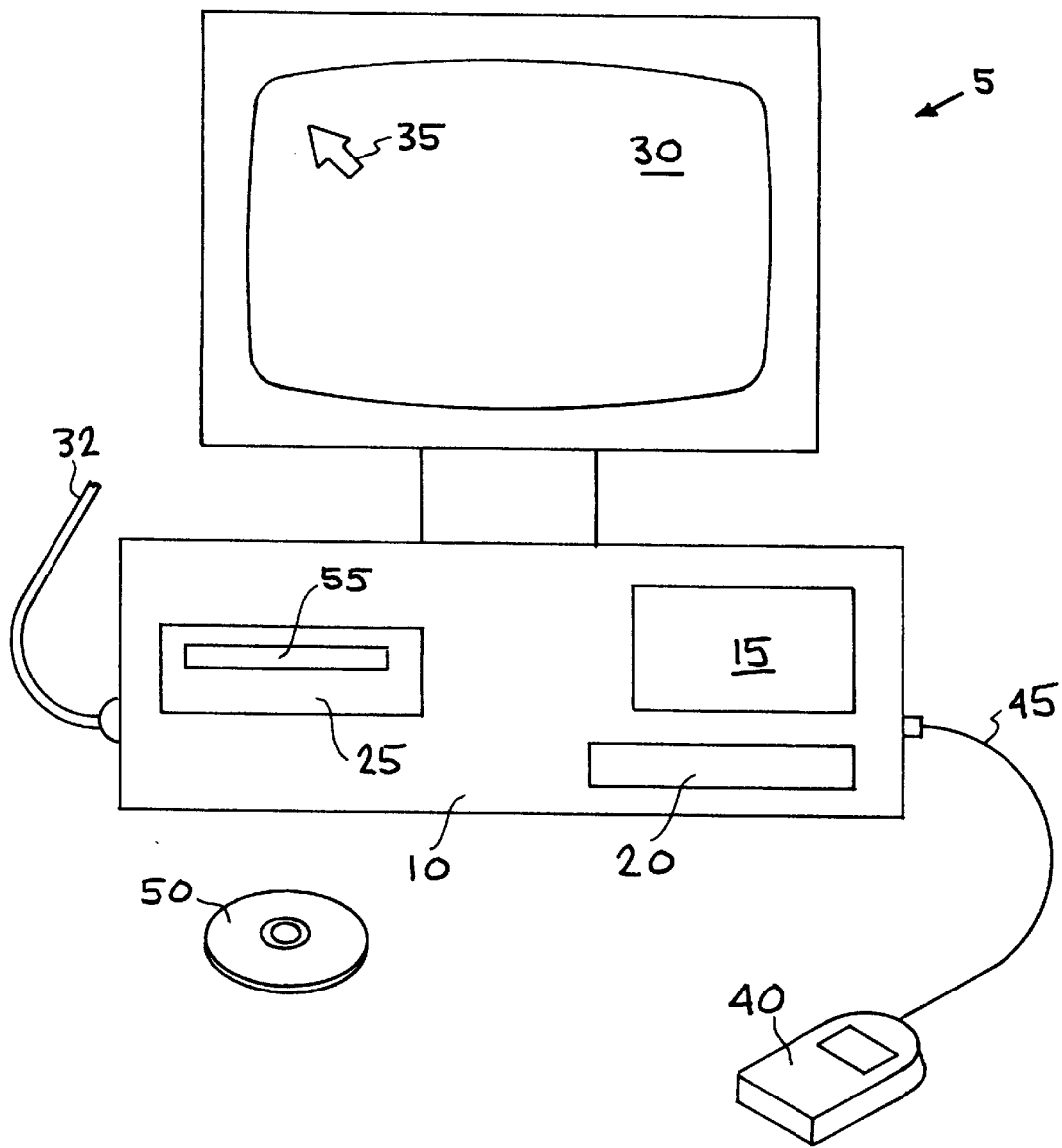
FIG. 1 illustrates the computer system of the invention containing a graphical display for implementing a computer graphical user interface utilizing the hysteresis schema of the invention to inhibit accidental selection of a region.

FIG. 1 illustrates the computer system of the invention, with a pixel-based graphical display for implementing a computer graphical user interface using hysteresis to inhibit accidental selection of a selectable region. The computer system 5 includes a computer console 10 containing therein a processing unit 15, itself comprising one or more microprocessors, a memory storage device 20, and a magnetic-medium reading device 25, such as a CD-rom reader. The reading device 25 contains a slot 55, into which a CD-rom or other computer readable medium such as a floppy disk can be inserted. The console 10 is connected to a pixel-based graphical display 30, typically a cathode ray tube or liquid crystal display. Cable 32 connecting to the console 10 provides the ability to transfer computer programs or other data (describing images, text, computer programs, etc.) to and from another computer device via e-mail, the Internet, direct access or the like. Pixel-based display 30 includes a cursor 35 which points at the current point-of-interest on the display. The computer system 5 also includes a cursor control device 40 such as a mouse, as shown, for controlling the position of cursor 35. The cursor control device 40 can also be a trackball, a touch pad, a digital tablet with stylus, a keyboard, or any of a number of devices commonly used to control computer cursors. Cursor control device 40 is connected to computer console 10 by cable 45. Computer console 10 represents the core system of any type of computer, such as a PC, a Macintosh, laptop, mainframe or the like. Computer console system 10 may also be coupled to various other interface devices such as a keyboard, internal or external memory drives, or a printer (not shown).

A computer program written for the purpose of enabling computer system 5 to implement a computer graphical user interface using hysteresis to inhibit accidental selection of a selectable region according to one embodiment of the present invention is inputted to and stored on a computer-readable medium such as CD-rom 50. Thereafter, the computer program is loaded into the computer system's memory storage unit 20. This loading may be accomplished by placing CD-rom 50 into slot 55 of the CD-rom reading device 25, whence the program is transferred to memory storage unit 20. Alternatively, the program, having been previously loaded into a computer at a remote location, may be fetched into memory storage unit 20 via cable 32. Once loaded into memory storage unit 20, the computer program is used by processing unit 15 to process the data from cursor control device 40 and to ascertain a revised location of display cursor 35 based on the data. Thereupon, processing unit 15 refreshes the image shown in display 30 to incorporate the revised cursor position.

The computer system 5 described above, in terms of its hardware, is one which is conventional in the industry, and each element can be purchased off the shelf, or as a complete system from computer vendors. The novelty of the system described lies in the computer program of the invention utilizing the hysteresis schema which is inputted into its memory system 20 from CD-rom reader 50 or other medium such as a floppy disk, or through cable 32.

The uniqueness and novelty of this invention can best be understood by reference to the figures.

Figure 2:
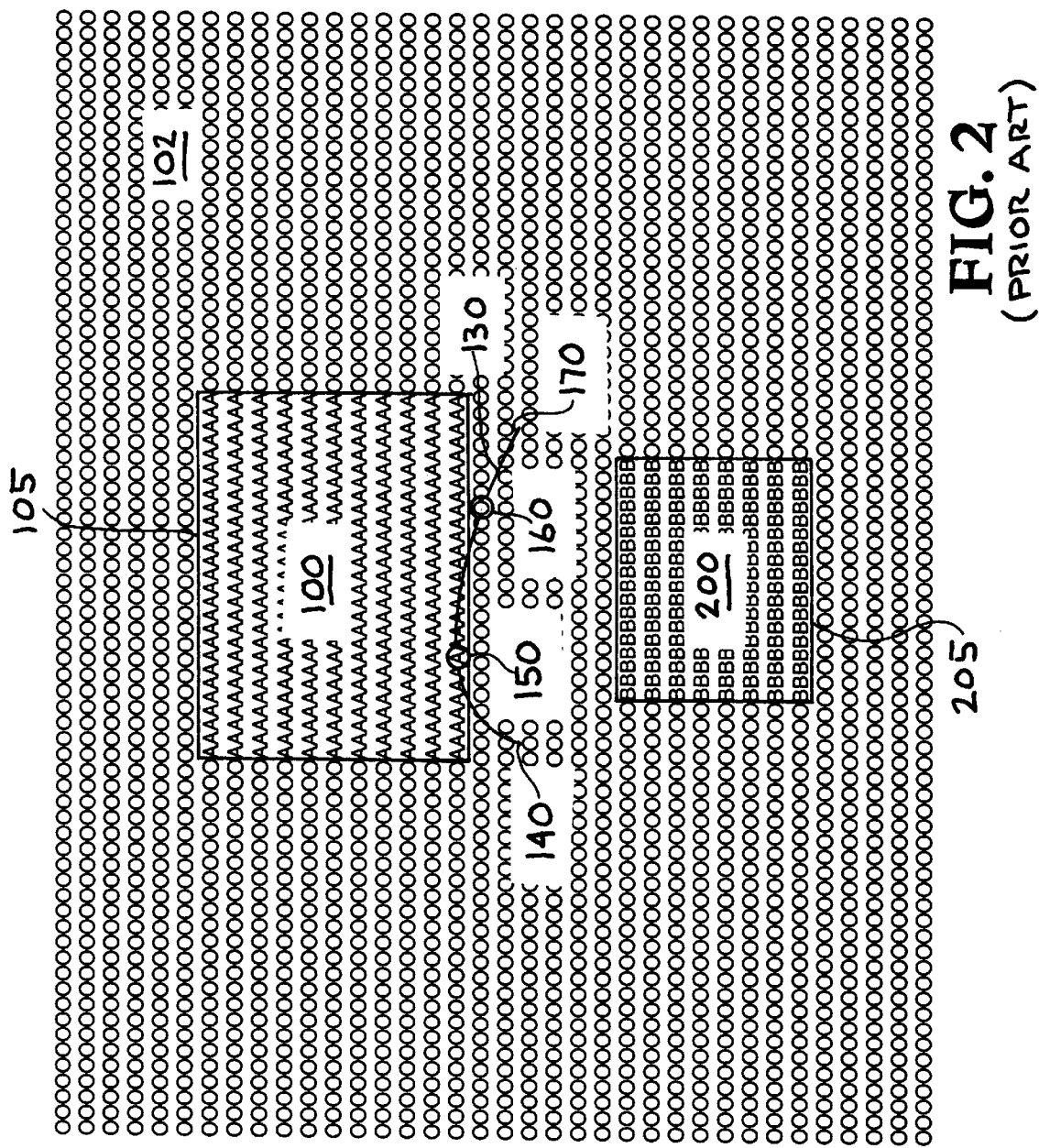
FIG. 2 shows the pixels of a portion of a computer display in accordance with the prior art, with the display being separated into three distinct regions.

FIG. 2 illustrates a pixel-based computer display with three distinctly separate regions. These are background Region O (region 102), within which all pixels are denoted "O", and two selectable regions, Region A (region 100) within which all pixels are denoted "A", and Region B (region 200) within which all pixels are denoted "B". Rectangular line 105 surrounding Region A (region 100) defines the boundary between Region O (region 102) and selectable Region A, and rectangular line 205 surrounding Region B (region 200) defines the boundary between Region O (region 102) and selectable Region B (region 200).

The computer system sets a state according to the position of the cursor with respect to the three Regions, O, A and B.

FIG. 2 illustrates a system without utilizing the hysteresis schema of the present invention. The state of the system corresponds precisely to the location of the cursor within one of the three regions, so that, explicitly, if the cursor is in background Region O, the system is in State O; if the cursor is in selectable region A, the system is in State A, and if the cursor is in selectable region B, the system is in State B.

Curve 130 of FIG. 2 illustrates a smooth path of a cursor from Region O into Region A and out again. The path starts at 140 with the cursor in background Region O; consequently the computer system is in State O. The cursor then moves up and to the right to point 150 at which time the cursor for the first time lies over an "A" pixel; the cursor is now in selectable Region A; consequently the computer system enters State A. The cursor then moves smoothly through Region A until, at point 160, it lies once again over an "O" pixel; the cursor is now in background Region O; consequently the computer re-enters State O. The cursor then remains over O pixels and the computer stays in State O until the cursor reaches the end of its trajectory at point 170.

In the preceding illustration there were two state transitions; from State O to State A at point 150 and from State A back to State O at point 160. Now consider what happens if the cursor movement over the arc from 140 to 170 is not smooth as in FIG. 2 but jittery as in FIG. 5b. In FIG. 5b the cursor starts at point 305, similar to point 140 in FIG. 2. It then traverses a hill-shaped path from left to right, ending at point 360, similar to point 170 in FIG. 2. The path traversed by the cursor in FIG. 5b, however, is jittery (it has lots of small hills and valleys superimposed over its general hill shape) unlike the smooth path in FIG. 2. In FIG. 5b, the cursor starts at 305 in Region O. Hence the system is in State O. At point 300 the cursor enters Region A. Hence the system enters State A. But the jittery cursor then drops almost immediately, at point 310, back into Region O. Consequently the system also reverts to State O. The two-state graph at the bottom of FIG. 5b shows the states of the system as the cursor moves from 305 to 360. A result of the jittery cursor movement is that there are now not two state transitions, as at points 150 and 160 of FIG. 2, but 10 state transitions. State A is entered five times (the first time is indicated by point 400) and exited five times (the first time is indicated by point 410) as the cursor jitters across the boundary 105 between Region O and Region A.

The extra undesired state changes that result from a jittery cursor, as illustrated in FIG. 5b, can be disconcerting—time consuming and confusing—to the user. The present invention permits their elimination, by means of the method and techniques illustrated in FIGS. 3, 4 and 5a.

Figure 3:
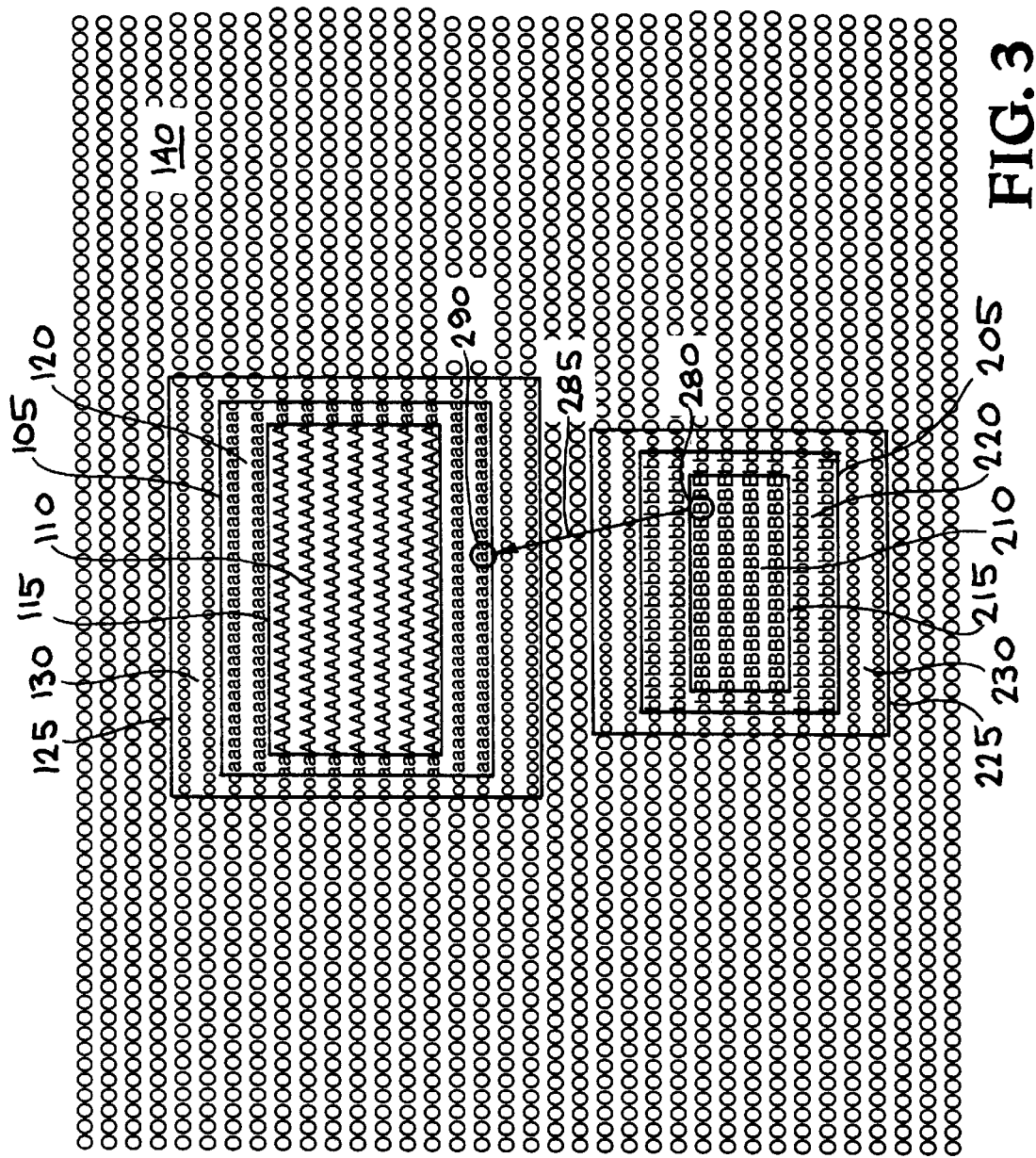
FIG. 3 shows the three regions of FIG. 2, further including border regions used to implement the hysteresis schema of the invention identified for each.

In FIG. 3, a border region has been drawn within each of the three regions adjacent to each of the boundaries between the regions. Border regions are indicated in FIG. 3 by a lower case letter corresponding to the upper case letter denoting the region. Border region 130 of FIG. 3, with pixels designated 'o', is the portion of Region O that borders Region A. Border region 120 of FIG. 3, with pixels designated 'a', is the portion of Region A that borders Region O. Border region 230, with pixels designated 'o', is the part of Region O that borders Region B. Finally, border region 220, with pixels designated 'b' is the part of Region B that borders Region O.

The portion of each region proper that does not lie within a border region is its core region. In FIG. 3 the core region of Region A is designated by the number 110, the core region of Region B is 210, and the core region of background region O is 140. The border regions shown graphically in FIG. 3, are graphic representations of computer software code written by the inventor to accomplish the desired objective. Once the desired objective is determined, the code can be written in a conventional manner by those skilled in the art.

In a system as is known in the prior art, without the hysteresis schema of this invention, as in FIG. 2 and FIG. 5b, the state-transition rule is:

State-Transition Rule 1

Any cursor motion puts the system in the state corresponding to the region in which the cursor lies.

In the first embodiment of the present invention, as illustrated in FIG. 3, the preceding state-transition rule is simply amended by adding the requirement that cursor motion into a border region can never cause a state change. This can be expressed as follows:

State-Transition Rule 2

A cursor motion puts the system in the state corresponding to the region in which the cursor lies unless the cursor location is a border region in which case the system stays in its prior state.

The result of Rule 2 is illustrated by 3, 4 and 5a. In FIG. 3, there are two border regions between Regions O and A. Border Region 130, with pixels designated 'o', comprises that part of Region O bordering Region A. Border Region 120 with pixels designated 'a', comprises that part of Region A bordering Region O.

Under Rule 2, the state-transition rule for when the cursor lands in a border region is "do not change state." This rule is independent of the specific border region. This means that when a cursor transects from one region to another, state transitions occur only at the boundaries between core portions of regions and border regions. For example, in FIG. 3, a cursor transect from Region O into Region A will have a state transition at the boundary 115 between the core of Region A and its border region; the reverse transect from Region A into Region O will have a state transition at the boundary 125 between the core of Region O and its border region. No state change will ever occur when the cursor crosses the boundary proper 105 between Region A and Region O. Boundary 105, is irrelevant to the state transition system under Rule 2.

Figure 4:
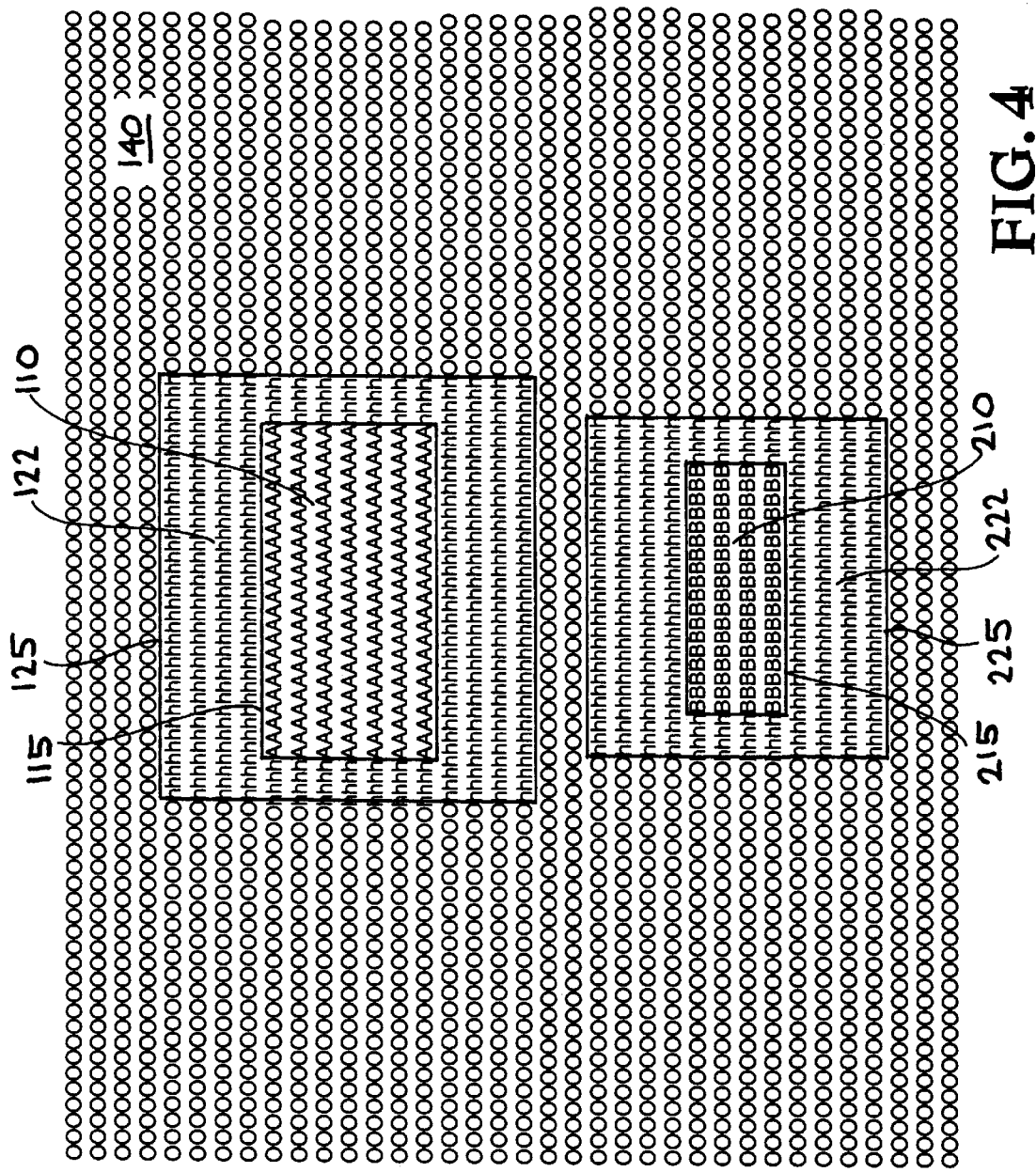
FIG. 4 shows the regions of FIG. 3 after merging of the border regions under one hysteresis schema.

The irrelevance of the region boundaries proper, and also of a border region's identity, to the state transition system under Rule 2 is demonstrated in FIG. 4. In FIG. 4 the identifying characters ('o', 'a' and 'b') of all four border regions (as in FIG. 3) have been replaced with the single character 'h' designating a hysteresis boundary region. The boundary lines 105 and 205 between regions proper (FIG. 3) have been eliminated.

In FIG. 4 border Region 122 is the union of Region 130 (Region O's border with Region A) and of Region 120 (Region A's border with Region O). Border Region 222 is the union of Region 230 (Region O's border with Region B) and of Region 220 (Region B's border with Region O).

Figure 5A:
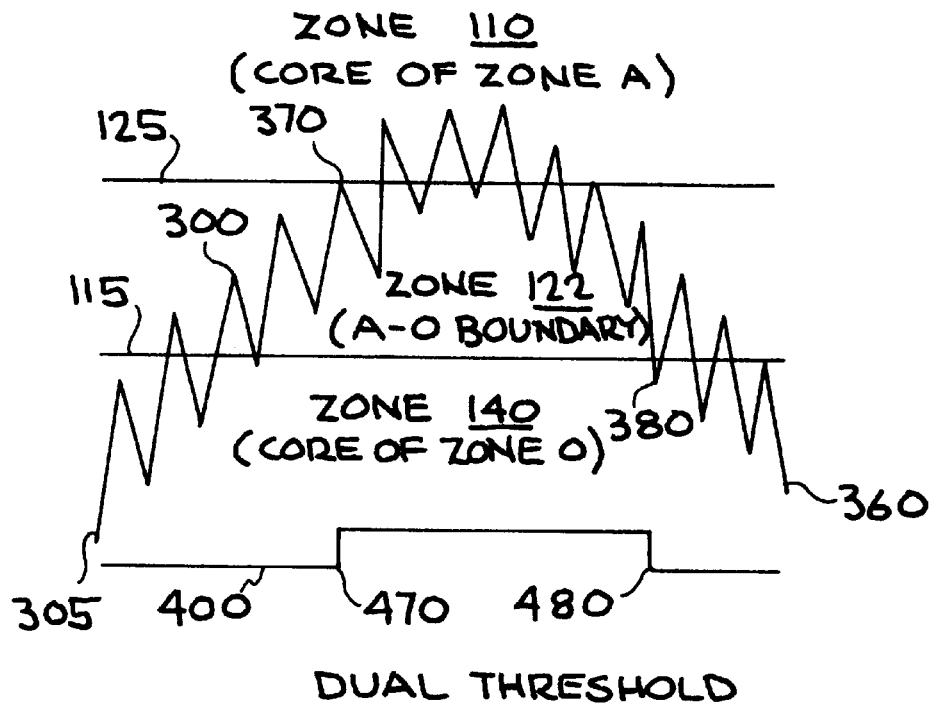
FIG. 5a is a graph of the motion of a jittery cursor moving generally left to right, illustrating how the hysteresis schema of this invention inhibits accidental selection or deselection of a region.
Figure 5B:
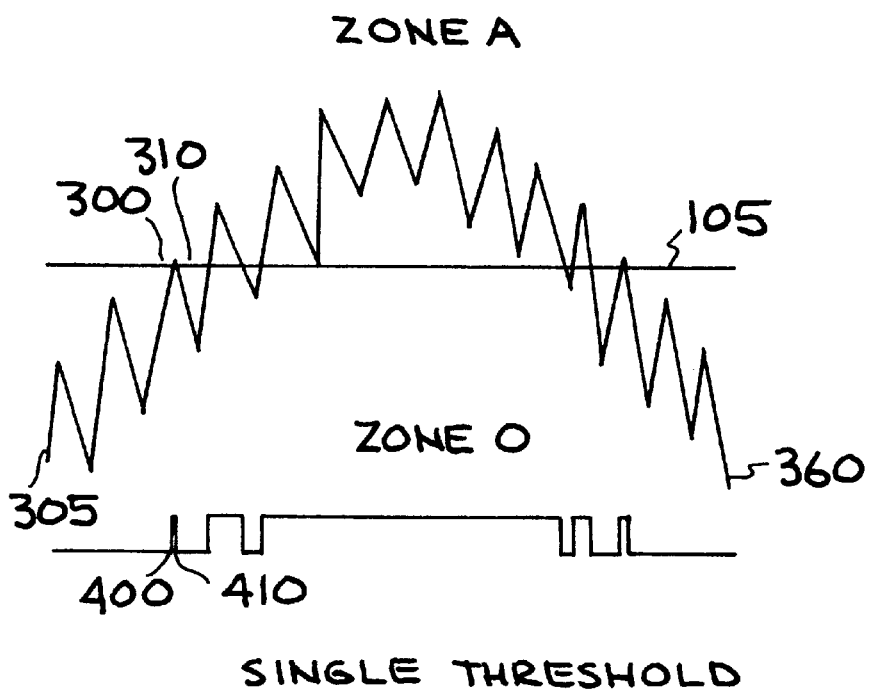
FIG. 5b is a graph of the motion of a jittery cursor moving generally left to right, illustrating the multiple changes in state which occur as a consequence of jitters.

FIG. 5a shows the effect of the addition of the border Region 122 and of the adoption of Rule 2 to the state changes occurring when the same jagged path (from point 305 to point 360) is traversed by the cursor as was traversed in FIG. 5b. In FIG. 5a, transition from State O to State A is retarded until the boundary 125 of Region A's core Region 110 is traversed. The transition through point 300, on the boundary 105 between the two regions proper now has no effect. The transition to State A is retarded until point 370 of FIG. 5a is reached, and the two-state diagram at the bottom of FIG. 5a shows the state change. Subsequently, additional motion along the transect from point 305 to 360 does not produce a reversion back to State O until the boundary 115 of State O's core region is traversed. The several jags in the path of FIG. 5a do not produce round-trip state changes (e.g., from State O to State A and back to State O again). This is because the minimum distance that must be traversed to produce a round-trip state change under the simple hysteresis Rule 2 is now twice the width of the border region.

For example, at 370 in FIG. 5a there is a transition from State O into State A. To produce a subsequent round-trip transition to State O and then back to State A again would require that the cursor fall from Region A's core boundary 125 to Region O's core boundary 115 and then rise back again to Region A's core boundary 125. As long as the boundary regions are created wider than the span of a normal "jitter", jittering cannot cause unwanted state transitions. In contrast, under the non-hysteresis State-Transition Rule 1, there is no lower limit on the size of the cursor movement that can cause a round-trip state transition. For example, the very tiny cursor movement from 300 to 310 produces just such a round trip state transition, from O to A and back to O, under the non-hysteresis Transition Rule 1 of FIG. 5b.

State-Transition Rule 2, as described above, can serve as the basis for a useful hysteresis-based graphical user interface system on popular current computers, thereby representing one embodiment of the invention. There are, however, other state-transition rules that are more suitable for conventional computers. The reason for this has to do with how cursor motion information is conveyed by the operating system to programs running on computers.

The discussion up to this point has treated the cursor motion information available to the computer program as if the motion was continuous. In fact, it is not. In a typical modern computer a message indicating cursor position is transmitted periodically or quasi-periodically by the computer operating system to the application program. Sequential messages of cursor location may or may not designate adjacent screen locations. Typically, if the user is moving the cursor-control device slowly, and/or if the computer's central processing unit is not very busy, sequential cursor-location messages will denote adjacent locations. However, if the user is moving the cursor-control device rapidly, and/or if the computer's central processing unit is very busy, sequential cursor-location messages will denote non-adjacent locations: locations that may be distant from each other by several pixels.

The latter situation is illustrated by vector 285 in FIG. 3. It is quite possible for a first cursor-location message to identify a pixel such as pixel 280, in the core region of Region B, and to then have the next cursor-location message identify a pixel such as pixel 290 separated from the previously identified pixel 280 by a distance of more than nine pixel units. In the particular example illustrated by vector 285, the cursor motion takes the cursor from the core region of Region B into the border region between Region O and Region A. The "landing point" of the cursor is nowhere near Region B. Yet, under State-Transition Rule 2, under which any cursor motion landing in a border region leaves the state unchanged, this cursor motion would leave the system in State B.

In order to accommodate for the fact of non-contiguous cursor motion in current computer systems, it is necessary to modify the State-Transition Rule. At least two sorts of modifications are possible. The former adds to Rule 2 a distance-of-motion requirement. The latter adds to Rule 2 a location-of-origin requirement.

The first supplemental transition rule is:

State-Transition Rule 3

A cursor motion puts the system in the state whose region corresponds to the cursor location if (A) the ending cursor location is a core region or (B) the distance of cursor motion from its beginning location to its ending location exceeds a predetermined threshold value; A cursor motion leaves the system in its prior state if (not A) the ending location is a border region and (not B) the distance of the cursor motion from its beginning location to its ending location is less than or equal to the predetermined value.

The objective of hysteresis-based state-transition rules such as Rule 2 was to prevent small jittering of the cursor to induce a state change. Rule 3 adds to Rule 2 the requirement that every cursor motion of a distance exceeding a threshold value place the system in the state corresponding to the cursor landing position. If the threshold distance exceeds the typical "jitter distance" then no cursor motion exceeding the threshold can result from a jitter, and any state change induced by such a motion is appropriate.

The second supplemental transition rule adds a location-of-origin requirement to Rule 2. The original exposition of Rule 2 above treated cursor motion as if it were continuous. If cursor motion is continuous, a region can only be entered from an adjacent region. It follows that system behavior in a case in which cursor motion is not continuous can be made to mimic system behavior under continuous cursor motion by adding the requirement that the border regions, i.e. hysteresis regions, inhibit state changes if and only if the cursor motion into a border region originated in an adjacent region. With reference to FIG. 3 and to the anomalous non-continuous cursor motion from pixel 280 of Region B to pixel 280 of the border region of non-contiguous Region A, a modified Rule 4 is required, for the case of border region 120 of Region A:

A cursor motion terminating in border region 120 of Region A leaves the system state unchanged (1) if the cursor motion originated in Region A itself or in contiguous Region O, but (2) puts the system in State A if the cursor motion originated elsewhere.

The preceding specific example can be generalized into Rule 4.temp:

State-Transition Rule 4.temp

A cursor motion leaves the system in its prior state if (A) the ending location pixel is in a border region and (B) the starting-location pixel was in a region identical to or adjacent to the region of the ending-location pixel. A cursor motion puts the system in the state whose region corresponds to the cursor location if (not A) the ending-cursor location pixel is a core region or (not B) the starting-location pixel was not in a region identical to or adjacent to the region of the ending-location pixel.

For reasons that will be apparent below, Rule 4.temp is not totally satisfactory. A further generalization of Rule 4.temp produces a satisfactory Rule 4. The generalization is now described.

The original hysteresis Rule 2 inhibits a state change whenever a cursor motion terminates on a pixel of a border region. Rule 4.temp restricts Rule 2's inhibition operator by saying that a state change is inhibited when a cursor motion terminates on a pixel of a border region if also the originating pixel was in a region adjacent to the region of the terminating pixel. The latter "if also" restriction is improved while also preserving the possibility of the exact intent of Rule 4 by modifying the preceding phrase into the statement that:

A state change is inhibited when a cursor motion terminates on a pixel of a border region if also the originating pixel was in a region identified as one for which cursor motion terminating on the terminal pixel does not produce a state change.

This modified rule frees the system from having to implement a set of strict adjacency rules. It can be difficult to formulate such rules to produce desired results, as the following example will show.

Before stating the Rule 4 which follows from the above-described modification to Rule 4.temp, it is useful to give an example of it. Such an example follows, with reference to FIGS. 6, 7 and 8.

Figure 6:
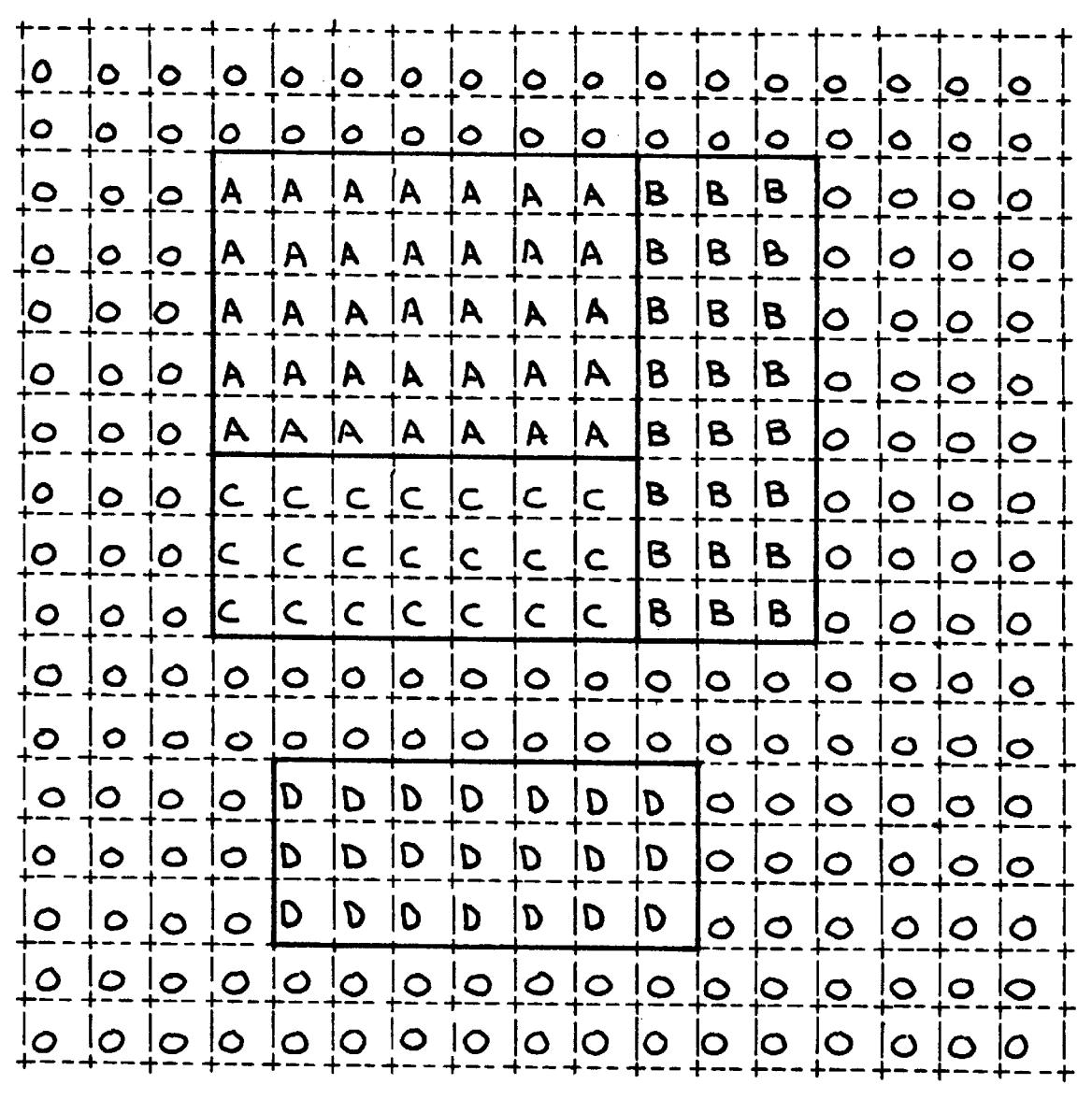

FIG. 6 shows the pixels of a portion of a computer display screen, including five Regions, O, A, B, C, D, with individual pixels denoted by the appropriate upper-case letter.

Figure 7:
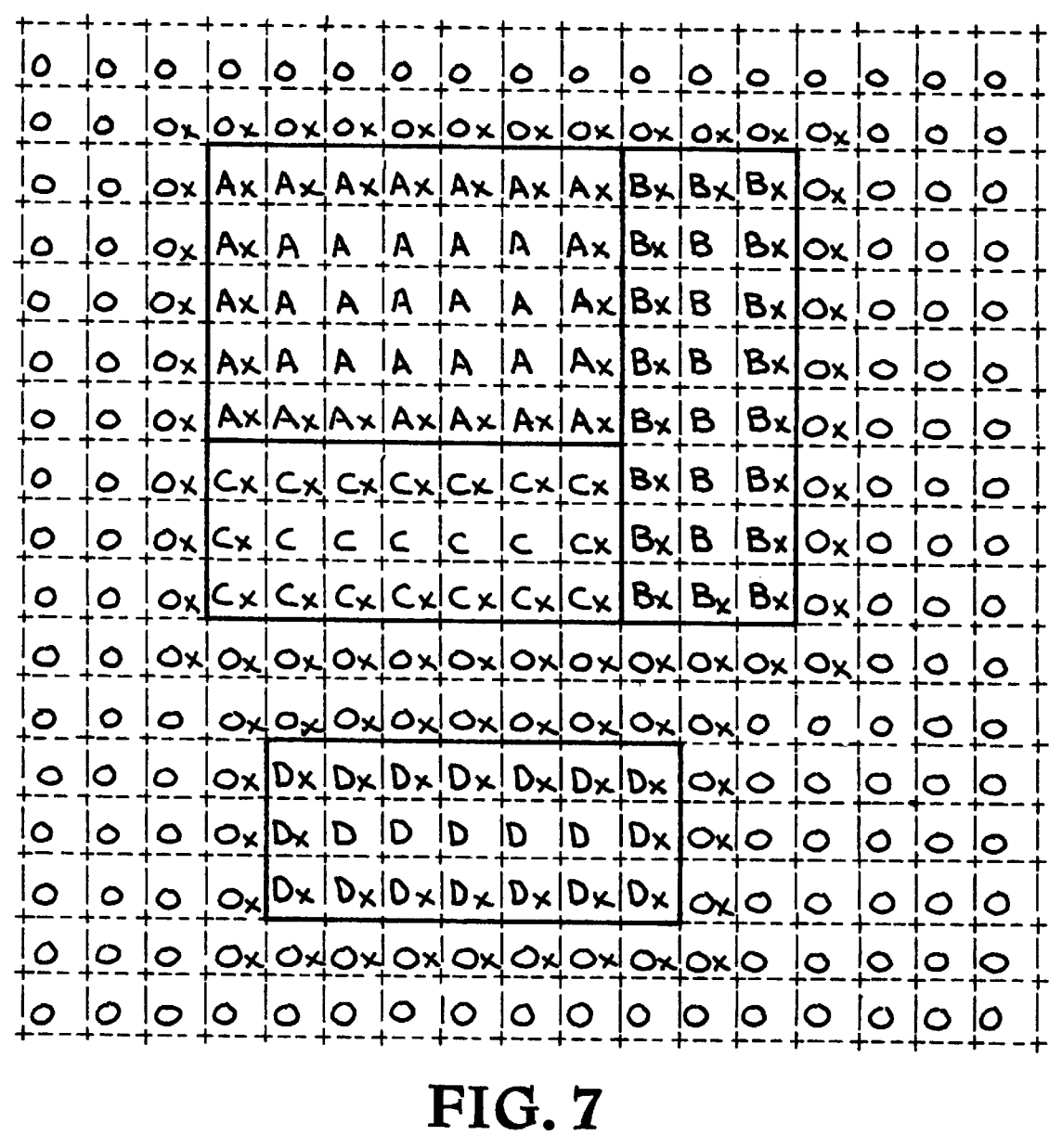

FIG. 7 shows the pixels of the same five regions after the identification for each region of a border region. The pixels of each border region are denoted by placing an 'x' after the letter that designates the region. For example, pixels denoted 'Ax' constitute the border region of Region A.

Figure 8:
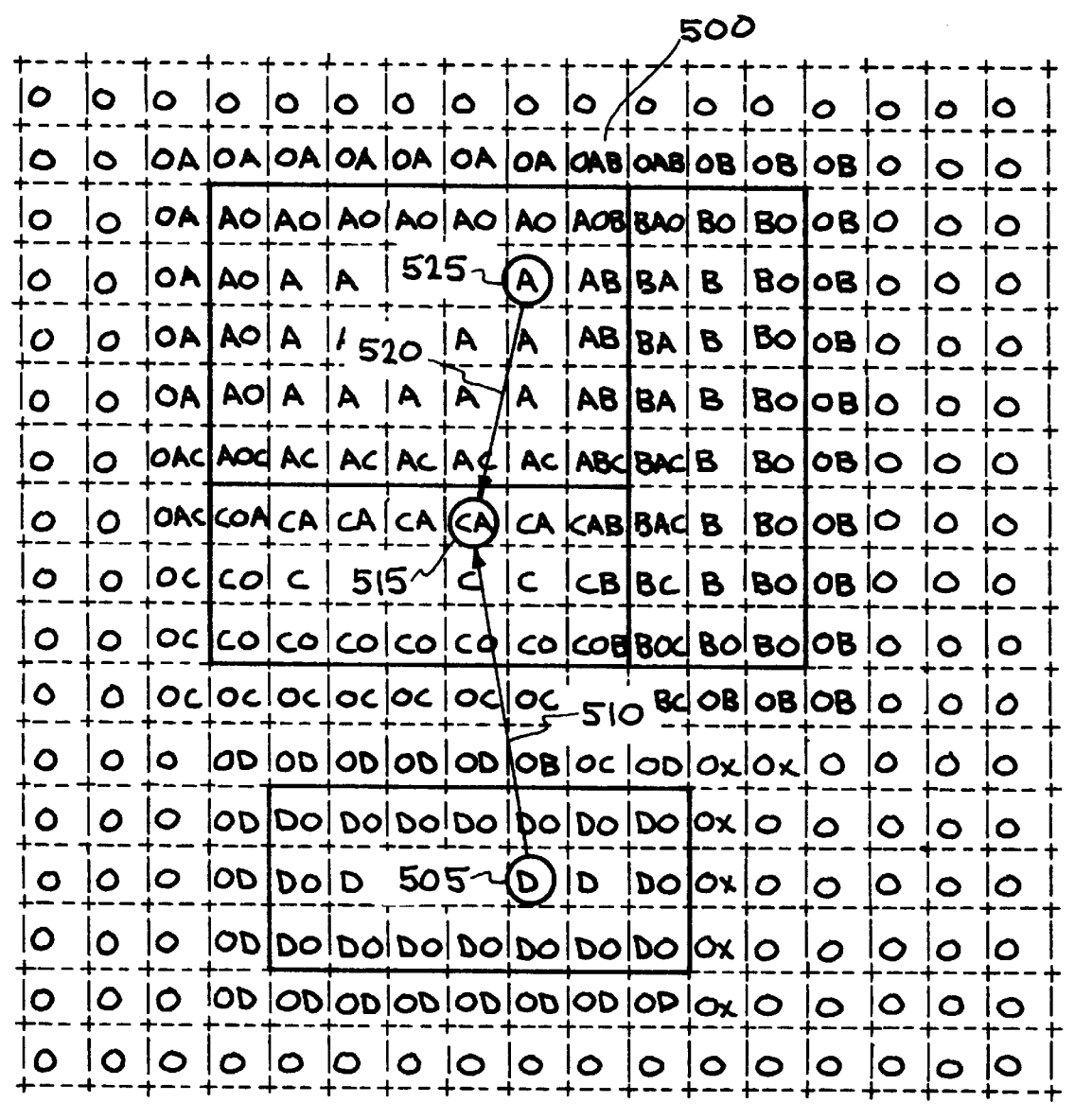

FIG. 8 shows the pixels of the same five regions after a process in which a set of "friend" regions is identified for each pixel of each border region. Here a region is a "friend" of a border-region pixel if a cursor motion beginning in the indicated friend region and terminating in the indicated border pixel will not produce a change of state in the system. For example, pixel 500 is in a border region of Region O and its two friend regions are Region A and Region B. Cursor motion beginning in either Region A or Region B and terminating on border pixel 500 will not produce a state change. Pixel 500 is thus a hysteresis pixel, a state-change inhibiting pixel, for cursor motions beginning in Region A or Region B.

The rule illustrated above requires the following test be performed after every cursor motion. Examine the list of regions associated with the pixel. The first element in this list is always the region within which the pixel lies; e.g., Region O in the case of pixel 500. In other words, the first region in the list identifies the "family" of the pixel. Subsequent regions in the list, if any, identify the "friends" of the pixel. The rule then is that if the cursor motion originated in the family of the pixel or in one of the friends of the pixel, then a state change is inhibited; otherwise the system changes its state to the state of the family of the terminating pixel.

This rule can be restated as Rule 4:

State-Transition Rule 4

Associated with every pixel is a first identifier indicating the region of the pixel. Associated with some pixels is a list of identifiers indicating regions that are "friends" of the pixel. A cursor motion leaves the system in its prior state if the prior state is the state of the region of the ending-location pixel or is the state of a friend-region of the ending-location pixel. Otherwise the cursor motion puts the system in the state of the region of the ending-location pixel.

State-Transition Rule 4 is more-flexible than State-Transition Rule 4.temp. The specific set of friend regions of the border pixels may be chosen by any algorithm. In contrast, Rule 4.temp is a version of Rule 4 that insists on a specific, not fully satisfactory, algorithm. To understand why Rule 4.temp's algorithm is not totally satisfactory, consider FIG. 8. Rule 4.temp says that a hysteresis border inhibits state transitions for regions that border its region. But all four "island" regions of FIG. 8, Regions A, B, C and D, border the background Region O. So, for example, looking at pixel 500 of FIG. 8, Rule 4.temp would say that any cursor movement originating in any of the four Regions A, B, C or D and terminating on border pixel 500 would cause a state change to be inhibited. In fact, straight-line motion to pixel 500 from Regions C and D necessarily implies motion across intervening regions, so that it is inappropriate for such motion to result in no change of state; it is preferable for such motion to result in a change of state to State O. The example of FIG. 8 implements a schema in which such considerations are taken into account. In fact, the actual schema implemented in FIG. 8 is that the "friends" of a given pixel are just those regions that border the pixel.

Many other rules can be useful.

One variant embodiment combines both distance-based and location-based tests to ascertain whether the inhibiting effect of a hysteresis pixel will hold for a specific cursor movement. For example, FIG. 8 includes a vector 510 illustrating a cursor movement from a pixel 505 in Region D to a pixel 515 in Region C's border region with Region A. A problem with the original hysteresis state-transition Rule 2 was that it inappropriately inhibited a state transition in the case of such a non-contiguous cursor motion (as was illustrated at 280, 285 and 290 of FIG. 4). This problem is now fixed by Rule 4. Pixel 515's list of friend regions references the single Region A. Cursor motion 510 begins in Region D. Region D is not a friend of pixel 515. Hence, by Rule 4, cursor motion 510 leads to a state change to State C. This is the desired result. However, location-based Rule 4 suppresses, perhaps undesirably, state changes for long cursor motions that begin in a friend region. For example, cursor motion 520 of FIG. 8 starts in Region A which is a friend of the terminating pixel 515. But the motion spans a distance of more than four pixel units. It is possible to write a state-transition rule which cancels the inhibiting effect of a hysteresis pixel when either (1) the originating region was not a friend of the terminating pixel, or (2) the distance traversed by the cursor motion exceeds a threshold. Any such combination of a distance-based and a location-based extension to the basic Rule 2 is part of this invention.

Another variant embodiment is designed to work in cases in which the locations of the selectable regions can be changed by the user. This embodiment is illustrated by FIGS. 9 and 10 and by the computer code in Table 1.

Figure 9:
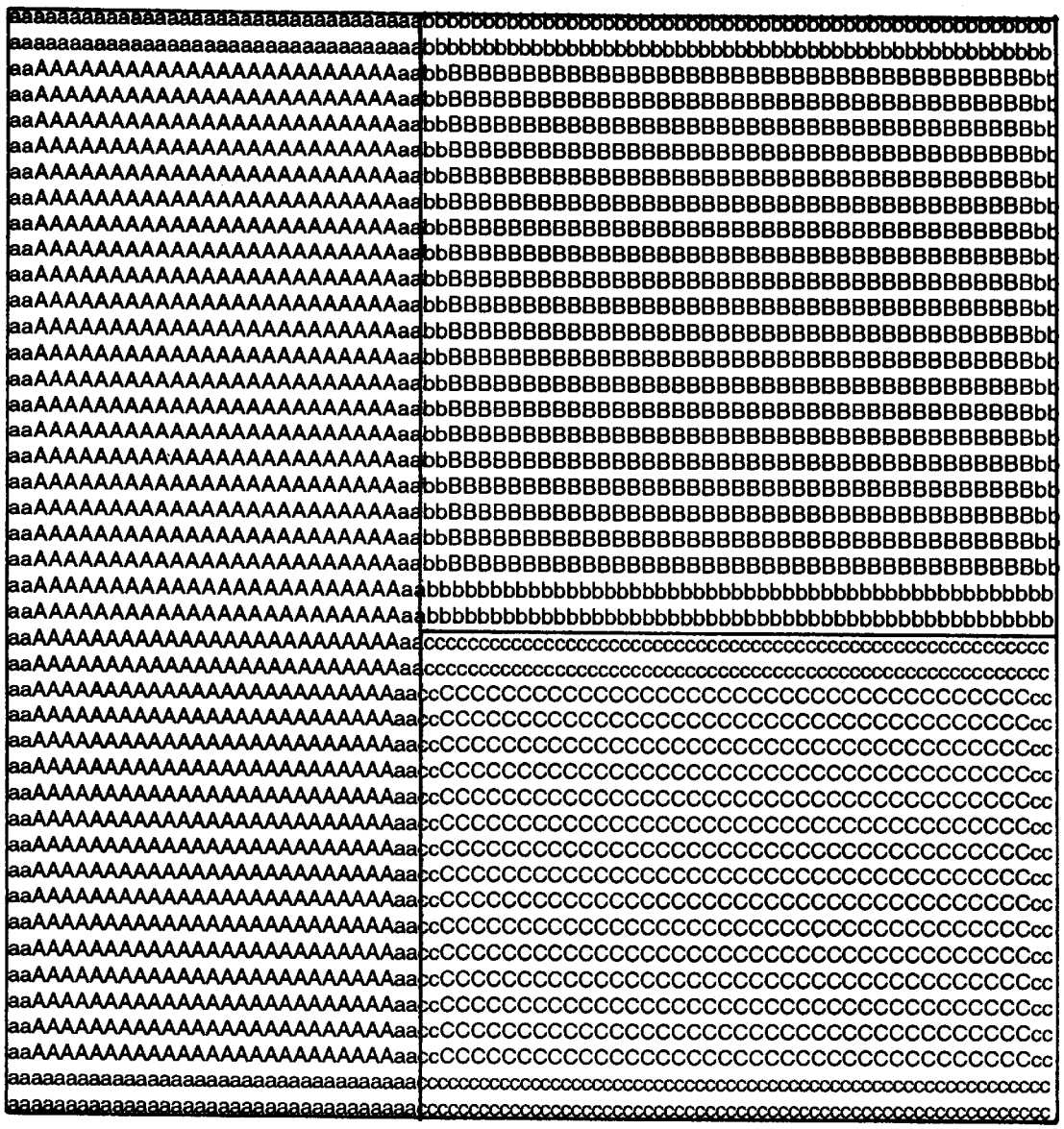
FIG. 9 shows a computer screen tiled by three user-lockable windows.

FIG. 9 illustrates the initial configuration of a computer screen. There are three selectable Regions, "A", "B", and "C", collectively exhausting (tiling) the screen. Each has a border hysteresis region. These are denoted respectively "a", "b", and "c". Region selection is suppressed for cursor motion terminating in a border region using the basic means of State-Transition Rule 2. However, the regions of FIG. 9 are software windows that can be "dragged" into new locations by a computer user using a mouse. FIG. 10 shows the computer screen after the three windows have been dragged into new locations. Now Region C partially overlaps Region B, and Regions B and C collectively have been moved to the right from Region A, revealing a previously unseen Region D.

Figure 10:
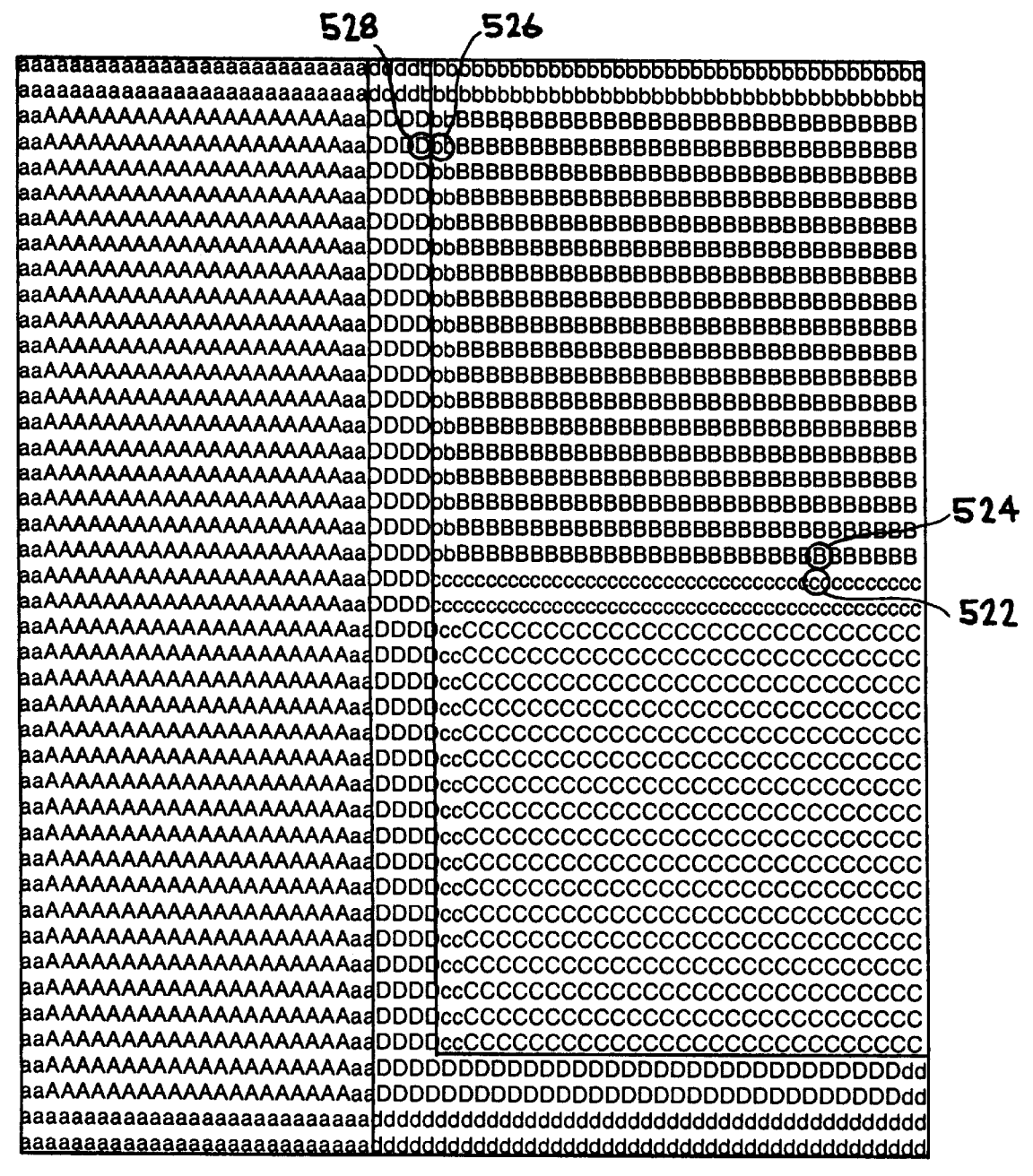

In the altered configuration of FIG. 10, the border regions of the windows no longer abut each other, since the windows now overlap each other, and no longer tile the screen. Now a cursor motion upward out of displaced Region C from pixel 522 to the closest (and in fact adjacent) visible pixel in Region B, pixel 524, does not land in Region B's border region. Hence, in this case, there will be no hysteresis effect under State-Transition Rule 2 unless it is somehow modified. Similarly, a cursor motion leftward out of Region B from pixel 526 to the closest (and in fact adjacent) visible pixel in newly-revealed Region D, pixel 528, does not land in Region D's border region. Hence, in this case too, there will be no hysteresis effect under State-Transition Rule 2 unless it is somehow modified.

An appropriate modification to State-Transition Rule 2 for the case illustrated by FIGS. 9 and 10 is to cause the hysteresis effect to take place when either the ending location is a border region or the cursor motion into the new region is short. Under this rule there is no state transition under either of the two illustrated short cursor motions of FIG. 10, from 522 to 524 or from 526 to 528, since both motions are only one pixel in length and hence fall short of any reasonable distance threshold.

This invention can be more clearly understood by reference to the computer code set forth in Table 1, below. The computer code of Table 1 executes the algorithm described above. The code was written in the C++ language to run on an Apple Macintosh® computer and to be compiled under the Metrowerks CodeWarrior® compiler and to use the Metrowerks PowerPlant® subroutine library. Hence it has features that are peculiar to this combination of computer language, compiler, and support library.

Portions of the code are explained below.

Procedure TpcApp::AdjustCursor, is a newly-written subroutine and is not a component supplied by Apple or Metrowerks. However, the Metrowerks company has set up the PowerPlant library so that PowerPlant will call any user-supplied AdjustCursor procedure whenever the cursor moves. This gives the program writer the opportunity to have his or her code execute in response to a cursor movement. Procedure AdjustCursor is passed an argument, "inMacEvent," of type EventRecord. The EventRecord contains a field, "where", indicating the location of the cursor in screen coordinates. At line 57 of the procedure the screen coordinates are copied into a variable, "loc", of type Point.

The procedure is set up so, depending on a compile-time variable "hys_option", declared at line 43, window selection can take place with or without a hysteresis option. The overall point of the procedure is to cause seven particular windows of this particular application to be selected whenever the cursor moves over one of them. In this context, to "select" a window means to cause it to acquire the "focus" of the application so that it is active and ready to accept user input commands from a mouse or from the keyboard. Visual cues indicate whether or not a window is selected and has the focus: the border of an active window is darkened in color. Also, an inactive window which was partially obscured by an overlapping window is brought to the front at the time of selection.

At line 58 the procedure calls a procedure, "FindWindow," of the Macintosh subroutine library, also referred to as the Macintosh "Toolbox." Procedure FindWindow is passed the location, "loc", of the cursor and the reference to the variable, "Window." The latter is of type "WindowPtr," a variable type defined by the Macintosh Toolbox. Procedure FindWindow assigns to WindowPtr a pointer to a data structure providing information about the window over which the cursor currently lies. The subsequent line, 59, translates the Macintosh Toolbox pointer, "Window," into another pointer, "ppWindow", of type, "LWindow," a type known to Metrowerks PowerPlant.

The main code block beginning at line 62 executes if variable ppWindow was correctly assigned a value.

Pointers to the seven windows of interest are copied into an array, "target", as locations zero through six. Then, at line 72, a "for-loop" begins. (The for-loop code extends from line 70 to through line 120). The for-loop executes once for each of the "NWINS" windows of interest, where NWINS was defined earlier, at line 13, to have the appropriate value, 7. At line 74 the procedure asks whether the window over which the cursor lies, ppWindow, is the same as the i-th window of interest. If so, the code block beginning at line 76 executes.

Line 76 asks whether the indicated window is already selected. If so, there is no action, and the code block of line 76 is skipped (since the whole point of the procedure is to select a window if not already selected).

If, however, the window is not already selected, the code block extending from line 77 to line 111 executes.

At line 78, the procedure asks whether the hysteresis option, hys_option, was selected. If not the procedure unconditionally selects the window of interest at line 79. If, however, the hys_option was selected the code block from lines 81 through 109 executes.

Consider now the code in the hysteresis code block from lines 81 through 109. It is this block that causes window selection to be suppressed in case the cursor is a hysteresis boundary region. In lines 82 and 83 the procedure loads from Macintosh-specific data structures into a programmer-created structure, FrameRect, the bounding dimensions of the window. At line 85 the program clears two flag variables, in_horz_bdry and in_vert_bdry, to default values of zero which may be overridden below. In the code block from line 87 through line 96 the procedure ascertains whether or not the cursor lies within a border region of width "hys_width" around the edge of the window. More precisely, the procedure makes two separate determinations. The first determination is whether or not the cursor lies within a horizontal strip bordering the top or bottom of the window; if so variable in_horz_bdry is set equal to 1. The second determination is whether or not the cursor lies within a vertical strip bordering the left or right of the window; if so variable in_vert_bdry is set equal to 1. Next, at lines 98 in 99 the procedure computes the square of the distance of motion of the cursor from its last position to its current position. At line 101 the procedure clears flag variable "hys_effect", setting it to zero. This default value may be overridden below. Then at lines 103 through 105 the procedure ascertains whether or not the hysteresis effect will be invoked for this cursor position in this window. The hysteresis effect is invoked if either the cursor is in the border region (if either in_horz_bdry or in_vert_bdry is nonzero) or if the distance-squared of cursor motion is less then the previously set value "hsquared". If any of these conditions holds, variable is hys_effect is set equal to 1 at line 105. Finally, at lines 107 and 108 if variable hys_effect has zero value, indicating that no hysteresis effect has been invoked, the window is selected; otherwise no action is taken.

The last action taken in response to having encountered one of the windows of interest happens at line 116. Once a window of interest has been found, there is no longer any need to continue the for-loop (which began line 72), and so at line 116 there is a break out of the for-loop.

The final substantive line of the procedure is line 127. By writing a special AdjustCursor procedure, TpcApp::AdjustCursor, the programmer overrode PowerPlant's own AdjustCursor procedure, LApplication::AdjustCursor. Hence, unless the programmer makes an explicit call to PowerPlant's own AdjustCursor procedure, PowerPlant will not have the opportunity to do whatever it would ordinarily do in response to a cursor movement. The call to LApplication::AdjustCursor at line 127 gives PowerPlant the opportunity to take its own cursor-adjustment actions.

TABLE 1

Computer Code

```
/* Proc */ void TpcApp::AdjustCursor (const EventRecord &inMacEvent)
{
    ///////////////////////////////////////////////
    //
    // Focus on a window-of-interest when mouse
    // mouse moves over it
    #define         NWINS           7
    WindowPtr       Window;
    Int16           WinRegion;
    LWindow         *ppWindow;
    LWindow         *target[NWINS];
    int i;
    Point loc;
    // Point last; // This is a variable of class TpcApp.
    Rect            frameRect;
    RgnHandle WindowFrame;
    // NB: struct Point and struct Rect are defined
    // as shown below
    //*
    struct Point
    {
        short v;
        short h;
    };
    struct Rect
    {
        short top;
        short left;
        short bottom;
        short right;
```

TABLE 1-continued

Computer Code

```
};
*/
unsigned char hys_option     = 1;
unsigned char hys_width      = 4;
unsigned char hys_dist       = 6;
unsigned char hys_effect     = 0;
unsigned char in_horz_bdry, in_vert_bdry;
short dtop, dleft, dbot, dright;
short dsquared, hsquared;
if   (TestBusy())
     return;
hsquared = hys_dist * hys_dist;
loc        = inMacEvent.where;
WinRegion = ::FindWindow (loc, &Window);
ppWindow = LWindow::FetchWindowObject (Window);
if   (ppWindow)
}
    target[0]= (LWindow *)WinPreview___;
    target[1]= (LWindow *)WinTonalControl___;
    target[2]= (LWindow *)WinColorControl___;
    target[3]= (Lwindow *)WinCube___;
    target[4]= (LWindow *)WinTonalGraph___;
    target[5]= (Lwindow *)Winconvert___;
    target[6]= (Lwindow *)WinRgbRgb___;
    for (i = 0; i < NWINS; i++)
    {
        if (ppWindow = = target[i])
        {
            if   (!UDesktop::WindowIsSelected (ppwindow))
            {
                if   (!hys_option)
                     ppwindow- >Select();
                else
                {
                    WindowFrame = ((Windowpeek)Window) - >strucRgn;
                    frameRect = (*WindowFrame) - >rgnBBox;
                    in_horz_bdry = in_vert_bdry = 0;
                    // Prior defaults may be overridden below
                    dleft = loc.h - frameRect.left;
                    dright = frameRect.right - loc.h;
                    dtop = loc.v - frameRect.top;
                    dbot = frameRect.bottom - loc.v;
                    // Note: larger v values are LOWER on pg.
                    if   (dleft < hys_width || dright < hys_width)
                         in_horz_bdry = 1;
                    if   (dtop < hys_width || dbot < hys_width)
                         in_vert_bdry = 1;
                    dsquared = (loc.h - last.h)*(loc.h - last.h) +
                               (loc.v - last.v)*(loc.v - last.v);
                    hys_effect = 0; // default; may be overridden
                    if   (in_horz_bdry || in_vert_bdry ||
                         dsquared < hsquared)
                         hys_effect = 1;
                    if   (!hys_effect)
                         ppWindow->Select();
                }
            } // End if (!WindowIsSelected())
            else
            //    if (WindowIsSelected)
                last = loc;
            break;      // Break out of the loop after
                        // handling the window.
        } // End if (ppWindow = = target[i])
    } // End for loop
} // End if (ppWindow)
/////////////////////////////////////////////////
// Now let PowerPlant do what it wants with the cursor
LApplication::AdjustCursor (inMacEvent);
}
```

It will be recognized by those skilled in the art, that, although this code was written in C++ language for a Macintosh computer, the same principles can be used to write the code in any other commonly used computer language.

The computer system of this invention is therefore a system which incorporates into its operation the graphical user interface computer program embodying the hysteresis schema which has been described herein. This enables regions on a computer screen to be selected or deselected with a cursor efficiently, and overcomes the negative effects of jitter in the cursor control device.

The computer readable medium of this invention is a floppy disk, CD-rom, or other unit containing imbedded therein a computer program which implements the hysteresis schema for movement of cursors described above.

The method of this invention is a method for inhibiting the accidental selection of a region of the computer display screen and consequent accidental state transition caused by jitter of the cursor control device.

The present invention, in its various embodiments, provides a simple, efficient solution to the problem of inhibiting accidental selection of a region and consequent accidental state transition in a computer system with a graphic computer interface.

The invention has been described in various embodiments. It should be recognized by those skilled in the art that many modifications and variations can be made thereto, and that the foregoing description should not be taken as limiting the scope of the appended claims

What is claimed is:

1. A computer system for inhibiting the accidental selection of a region of the computer display and consequent accidental state transition comprising:
   (a) a processing unit,
   (b) a memory storage device,
   (c) at least one data input device coupled to said processing unit,
   (d) a pixel based display device containing a screen coupled to said processing unit which when in operation displays a movable cursor on said screen, and
   (e) a program module stored in said memory storage device capable of providing instructions to said memory storage device, and operative to construct for each of a set of selectable regions on the screen of said pixel based display device a border region which inhibits cursor based selection of a selectable region when cursor motion terminates in the border region of said selectable region.

2. The computer system of claim 1 wherein said processing unit is further operative to:
   maintain for each cursor motion a record of the cursor's prior pixel location, maintain a fixed cursor-distance threshold value, on each cursor motion that terminates in a border region, compute a measure of the distance of motion of the cursor from its prior location to its current location, and suppress the inhibition of cursor-based selection of a selectable region that normally occurs for cursor motion terminating in the border region of said selectable region in those cases in which the distance of motion of the cursor is greater than a predetermined cursor-distance threshold value.

3. The computer system of claim 1 wherein said processing unit is further operative to:
   construct for each pixel of each border region a list of associated selectable regions, maintain for each cursor motion a record of the selectable region within which the cursor resided prior to the motion, and suppress the inhibition of cursor-based selection of a selectable region that normally occurs for cursor motion terminating in the border region of said selectable region in those instances in which the selectable region in which the cursor motion originated is a selectable region that is not in the list of selectable regions associated with the pixel on which the motion terminated.

4. A method for inhibiting the accidental selection by a movable cursor of a selectable region on the display screen of a computer having at least one selectable region, comprising the steps of: constructing a border region for each selectable region of the computer display screen, and, inhibiting cursor-based selection of a selectable region when cursor motion terminates in said border region.

5. The method of claim 4 wherein the computer display screen has a plurality of selectable regions displayed thereon, and a border region is constructed for each of said selectable regions.

6. The method of claim 4 further comprising the steps of:
   maintaining for each cursor motion a record of the cursor's prior pixel location; choosing a fixed cursor-distance threshold value; on each cursor motion that terminates in a border region computing a measure of the distance of motion of the cursor from its prior location to its current location; and suppressing the inhibition of cursor-based selection of a selectable region that normally occurs for cursor motion terminating in a border region of said selectable region in those cases in which the distance of motion of the cursor is less than the predetermined cursor-distance threshold value.

7. The method of claim 4 further comprising the steps of:
   constructing for each pixel of each border region a list of associated selectable regions; maintaining for each cursor motion a record of the selectable region within which the cursor resided prior to the motion; and suppressing the inhibition of cursor-based selection of a selectable region that normally happens for cursor motion terminating in a border region of said selectable region in those cases in which the selectable region in which the cursor motion originated was a selectable region that was not in the list of selectable regions associated with the pixel on which the motion terminated.

8. A computer-readable medium on which is stored a computer program for inhibiting the accidental selection of a region of the computer display and consequent accidental state transition, said computer program comprising instructions which, when executed by said computer perform the steps of:
   constructing for each of a set of selectable regions of the computer display a border region, and inhibiting cursor-based selection of a selectable region when cursor motion terminates in a border region.

9. The computer-readable medium of claim 8 wherein said computer program contains instructions to further performs the steps of:
   maintaining for each cursor motion a record of the cursor's prior pixel location; choosing a fixed cursor-distance threshold value; on each cursor motion that terminates in a border region computing a measure of the distance of motion of the cursor from its prior location to its current location; and suppressing the inhibition of cursor-based selection of a selectable region that normally occurs for cursor motion terminating in a border region of said selectable region in those instances in which the distance of motion of the cursor was less than the predetermined cursor-distance threshold value.

10. The computer-readable medium of claim 8 wherein said computer program further performs the steps of:

constructing for each pixel of each border region a list of associated selectable regions; maintaining for each cursor motion a record of the selectable region within which the cursor resided prior to the motion; and suppressing the inhibition of cursor-based selection of a selectable region that normally occurs for cursor motion terminating in a border region of said selectable region in those cases in which the selectable region in which the cursor motion originated is a selectable region that was not in the list of selectable regions associated with the pixel on which the motion terminated.

11. The computer-readable medium of claim 8 wherein the medium is a floppy disc.

12. The computer-readable medium off claim 8 wherein the medium is a CD-rom.

\* \* \* \* \*